(12) United States Patent  
Sato

(10) Patent No.: US 6,614,933 B1
(45) Date of Patent: *Sep. 2, 2003

(54) IMAGE PROCESSING APPARATUS AND METHOD, AND STORAGE MEDIUM

(75) Inventor: Makoto Sato, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/310,130

(22) Filed: May 12, 1999

(30) Foreign Application Priority Data

May 19, 1998 (JP) .......................... 10-136738

(51) Int. Cl.⁷ ................................ G06K 9/36

(52) U.S. Cl. .............. 382/232; 382/234; 382/242; 358/426.02

(58) Field of Search ................. 382/232, 234, 382/237, 238, 239, 240, 242, 243; 358/426.01, 426.02, 426.14, 426.13; 348/384.1, 393.1, 394.1, 395.1, 398.1

(56) References Cited

U.S. PATENT DOCUMENTS

| 5,402,248 | A | | 3/1995 | Sato et al. ................ 358/426 |
| 5,812,146 | A | | 9/1998 | Sato et al. ................ 345/501 |
| 5,861,892 | A | | 1/1999 | Sato et al. ................ 345/435 |
| 6,236,757 | B1 | * | 5/2001 | Zeng et al. ................ 382/240 |
| 6,337,929 | B1 | * | 1/2002 | Kajiwara et al. ........... 382/239 |

* cited by examiner

Primary Examiner—Thomas D. Lee
(74) Attorney, Agent, or Firm—Fitzpatrick, Cella, Harper & Scinto

(57) ABSTRACT

An encoding method efficiently encodes information relating to a multivalue image having an arbitrary shape, i.e., a rectangular or non-rectangular shape. An image processing apparatus includes an input unit for inputting a multivalue image, a first transformation unit for transforming the multivalue image input by the input unit with a first transformation method and for generating first transformation coefficients, a second transformation unit for transforming shape information indicating a shape of the multivalue image transformed by the first transformation unit with a second transformation method different from the first transformation method and for generating second transformation coefficients, and an encoding unit for encoding each of blocks configured by the first transformation coefficients and blocks configured by the second transformation coefficients using a common encoding method.

11 Claims, 14 Drawing Sheets

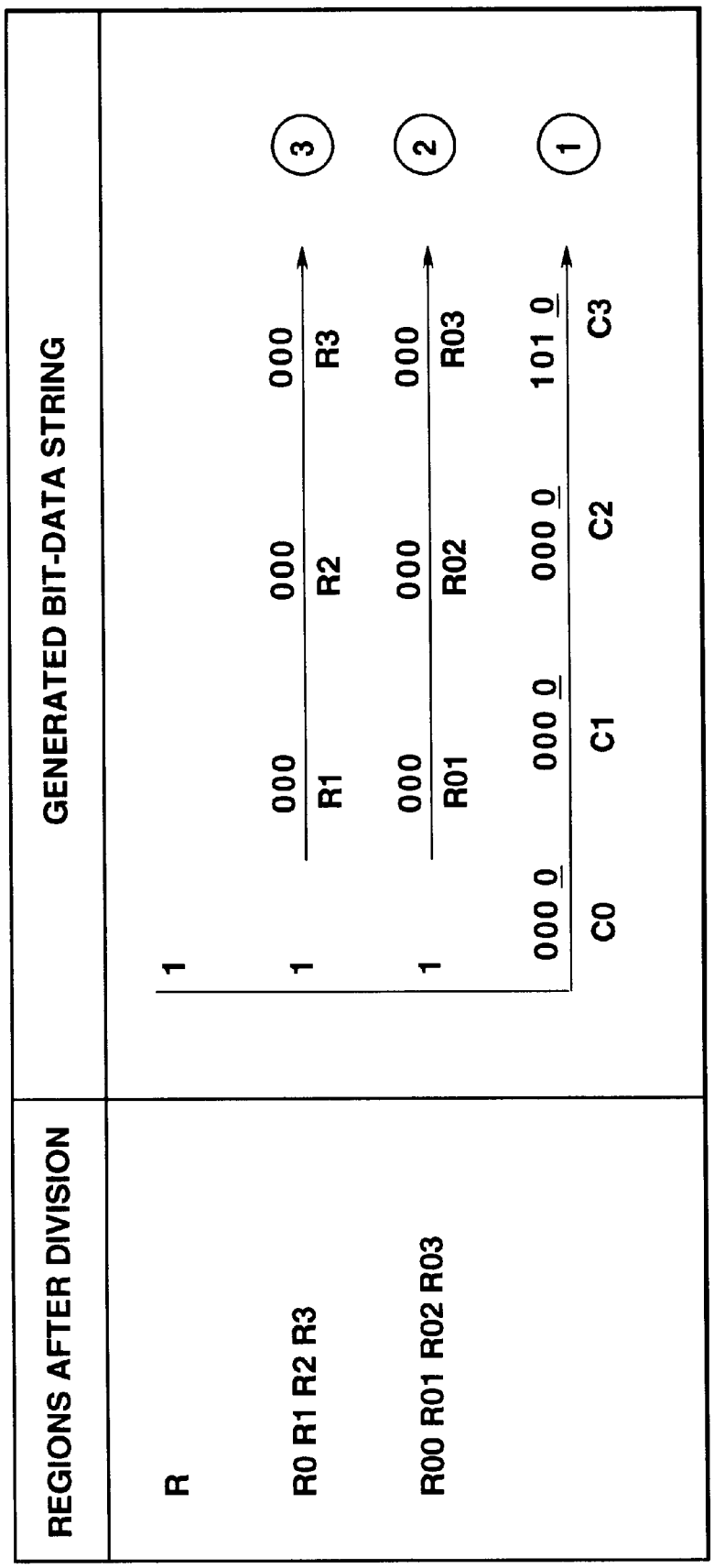

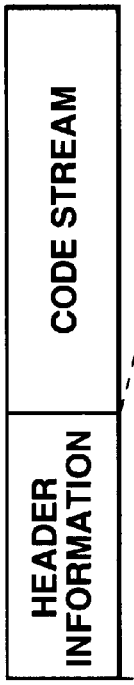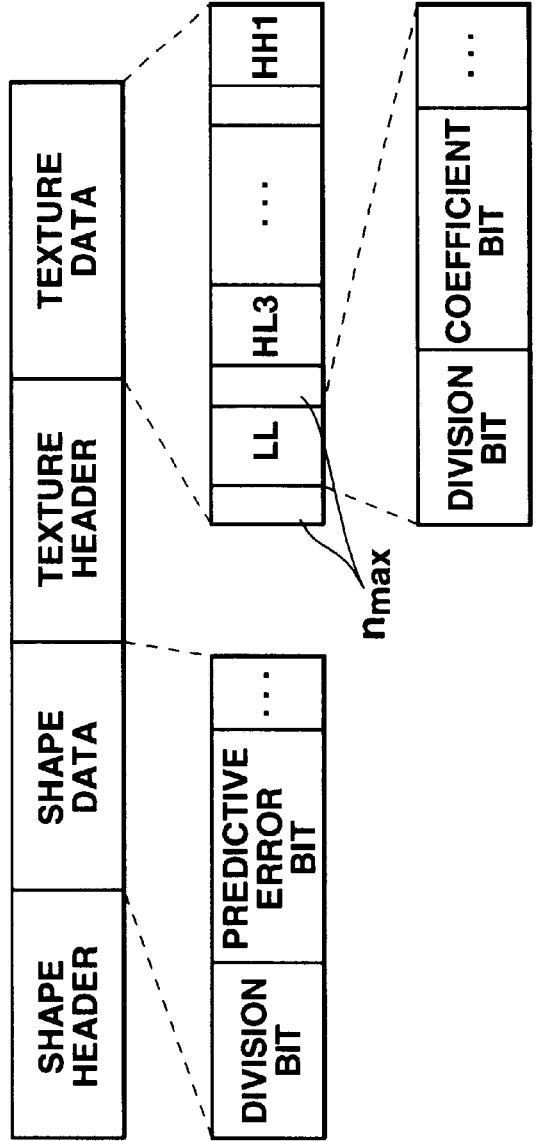

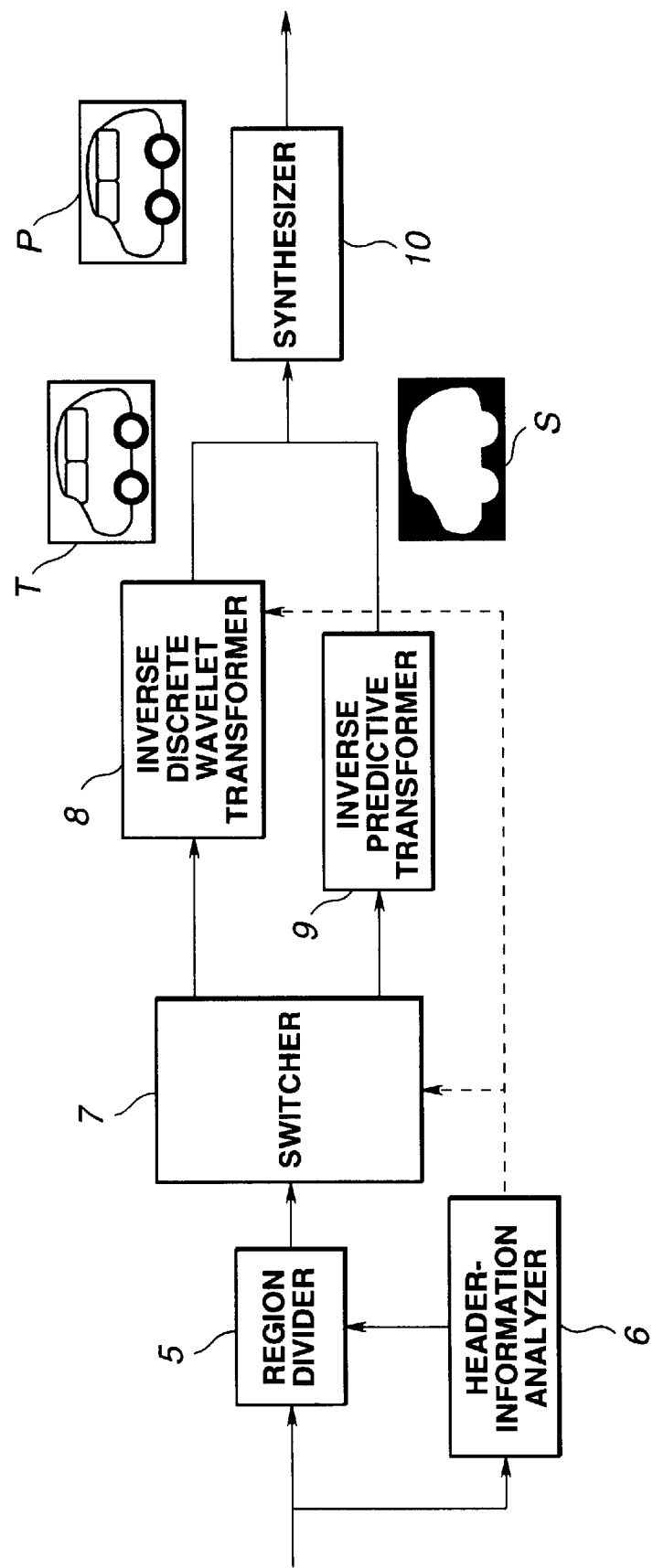

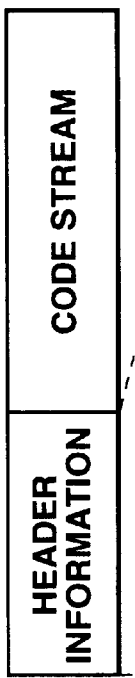
FIG.13A
FIG.13B
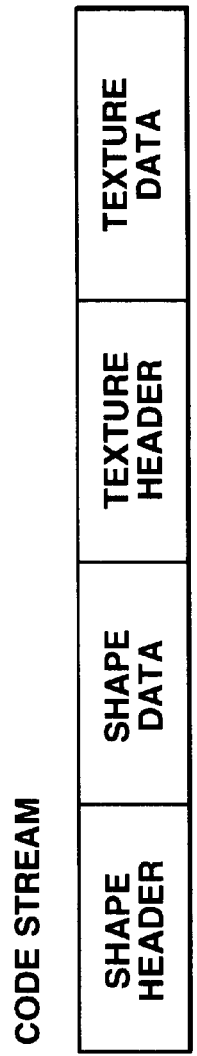
FIG.13C
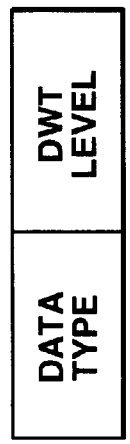
FIG.13D
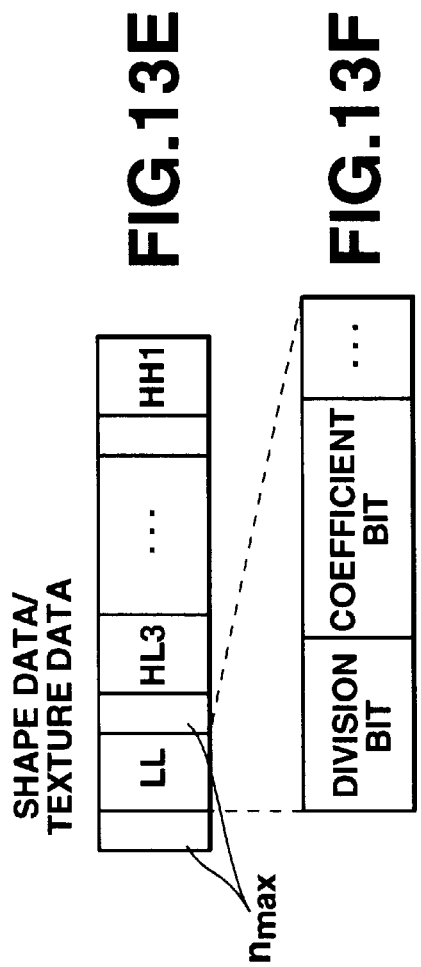
FIG.13E
FIG.13F

IMAGE PROCESSING APPARATUS AND METHOD, AND STORAGE MEDIUM

BACKGROUND OF THE INVENTION

1. Field of the Invention

The present invention relates to an image processing apparatus and method for encoding image data, and a recordng medium storing a computer program for this method.

2. Description of the Related Art

In accordance with recent remarkable improvement in the performance of PCs (personal computers), image data is widely used in the PCs. Usually, image data is represented in the form of a digital signal string in the PC. Since each pixel corresponds to one piece of data, there is a very large amount of image data. Particularly when image data is dealt with in a computer or on a network where computers are interconnected, the amount of data causes, in some cases, problems.

In the above-described situations, when storing and transmitting image data, compression encoding of the image data is widely performed. So-called JPEG (Joint Photographic Experts Group), serving as a standard method for compressing a multivalue still image according to ITU-T (International Telecommunication Union-Telecommunication Standardization Sector) recommendation T.81, is known as such an image compression technique. The JPEG is particularly suitable for compressing a natural image. In the JPEG, an image to be encoded is divided into blocks, each having a size of 8×8 pixels, and discrete cosine transformation is performed for each of the blocks. Obtained transformation coefficients are quantized and are subjected to entropy encoding.

As the instances of dealing with image data in a PC increase as a result of the diffusion of computers, digital cameras and the like, there is an increasing necessity for processing/editing the image data. In such uses, image data is desirably configured in units of a certain object constituting each image.

For example, when it is intended to perform color balance adjustment only for a person in an image where the person is present in front of a background, it is easy to process only the person if the background and the person are included in the image data as data of different units.

For example, when executing JPEG compression encoding, an image to be encoded is divided into blocks in encoding processing. Basically, the entire image is subjected to encoding. Hence, when performing processing, such as color balance adjustment or the like, for an image subjected to JPEG compression encoding, it is necessary to process an object after extracting it from a decoded image.

On the other hand, techniques for performing compression encoding for each object are being studied as methods for encoding a moving image.

However, an efficient method for performing compression encoding of each object within a still image has not yet been established.

SUMMARY OF THE INVENTION

It is an object of the present invention to solve the above-described problems.

It is another object of the present invention to provide an encoding method for efficiently encoding information relating to a multivalue image having an arbitrary shape, i.e., a rectangular or non-rectangular shape.

According to one aspect, the present invention which achieves the above-described object relates to an image processing apparatus including input means for inputting a multivalue image, first transformation means for transforming the multivalue image input by the input means with a first transformation method and for generating first transformation coefficients, second transformation means for transforming shape information indicating a shape of the multivalue image transformed by the first transformation means with a second transformation method different from the first transformation method and for generating second transformation coefficients, and encoding means for encoding each of blocks configured by the first transformation coefficients and blocks configured by the second transformation coefficients using a common encoding method.

According to another aspect, the present invention relates to an image processing method including an input step of inputting a multivalue image, a first transformation step of transforming the multivalue image input in the input step with a first transformation method and generating first transformation coefficients, a second transformation step of transforming shape information indicating a shape of the multivalue image transformed in the first transformation step with a second transformation method different from the first transformation method and generating second transformation coefficients, and an encoding step of encoding each of blocks configured by the first transformation coefficients and blocks configured by the second transformation coefficients using a common encoding method.

According to still another aspect, the present invention relates to a storage medium storing an image processing program so as to be readable from a computer. The image processing program includes an input step of inputting a multivalue image, a first transformation step of transforming the multivalue image input in the input step with a first transformation method and generating first transformation coefficients, a second transformation step of transforming shape information indicating a shape of the multivalue image transformed in the first transformation step with a second transformation method different from the first transformation method and generating second transformation coefficients, and an encoding step of encoding each of blocks configured by the first transformation coefficients and blocks configured by the second transformation coefficients using a common encoding method.

It is still another object of the present invention to efficiently encode information relating to a multivalue image having an arbitrary shape by providing a new encoding method as a part of the above-described encoding method.

According to yet another aspect, the present invention which achieves the above-described object relates to the image processing apparatus wherein the encoding means generates encoded data including information indicating positions of efficient transformation coefficients by repeating division processing for each of the blocks configured by the first transformation coefficients and the blocks configured by the second transformation coefficients, and outputs the encoded data.

It is yet another object of the present invention to provide an encoding method capable of efficiently encoding a plurality of types of image data obtained from the same multivalue image.

According to yet a further aspect, the present invention which achieves the above-described object relates to an image processing apparatus including input means for inputting a multivalue image, first transformation means for transforming the multivalue image input by the input means with a first transformation method and for generating first transformation coefficients, second transformation means for transforming another image obtained from the multivalue image transformed by the first transformation means with a second transformation method different from the first transformation method and for generating second transformation coefficients, and encoding means for encoding each of blocks configured by the first transformation coefficients and blocks configured by the second transformation coefficients using a common encoding method.

It is yet a further object of the present invention to efficiently encode the plurality of kinds of image data by providing a new encoding method as a part of the above-described encoding method.

According to still another aspect, the present invention which achieves the above-described object relates to the image processing apparatus wherein the encoding means generates encoded data including information indicating positions of efficient transformation coefficients by repeating division processing for each of the blocks configured by the first transformation coefficients and the blocks configured by the second transformation coefficients, and outputs the encoded data.

According to still another aspect, the present invention relates to an image processing method including an input step of inputting a multivalue image, a first transformation step of transforming the multivalue image input in the input step with a first transformation method and for generating first transformation coefficients, a second transformation step of transforming another image obtained from the multivalue image transformed in the first transformation step with a second transformation method different from the first transformation method and generating second transformation coefficients, and an encoding step of encoding each of blocks configured by the first transformation coefficients and blocks configured by the second transformation coefficients using a common encoding method.

According to still another aspect, the present invention relates to a storage medium storing an image processing program so as to be readable from a computer. The image processing program includes an input step of inputting a multivalue image, a first transformation step of transforming the multivalue image input in the input step with a first transformation method and generating first transformation coefficients, a second transformation step of transforming another image obtained from the multivalue image transformed in the first transformation step with a second transformation method different from the first transformation method and generating second transformation coefficients, and an encoding step of encoding each of blocks configured by the first transformation coefficients and blocks configured by the second transformation coefficients using a common encoding method.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 4 is a diagram illustrating a bit-data string generated by region division;

FIGS. 7A–7F are diagrams illustrating encoded data in the first embodiment;

FIG. 8 is a block diagram illustrating the configuration of a decoder in the first embodiment;

FIGS. 13A–13F are diagrams illustrating encoded data in the second embodiment.

DETAILED DESCRIPTION OF THE PREFERRED EMBODIMENTS

Preferred embodiments of the present invention will now be sequentially described with reference to the drawings.

First Embodiment

Figure 1:
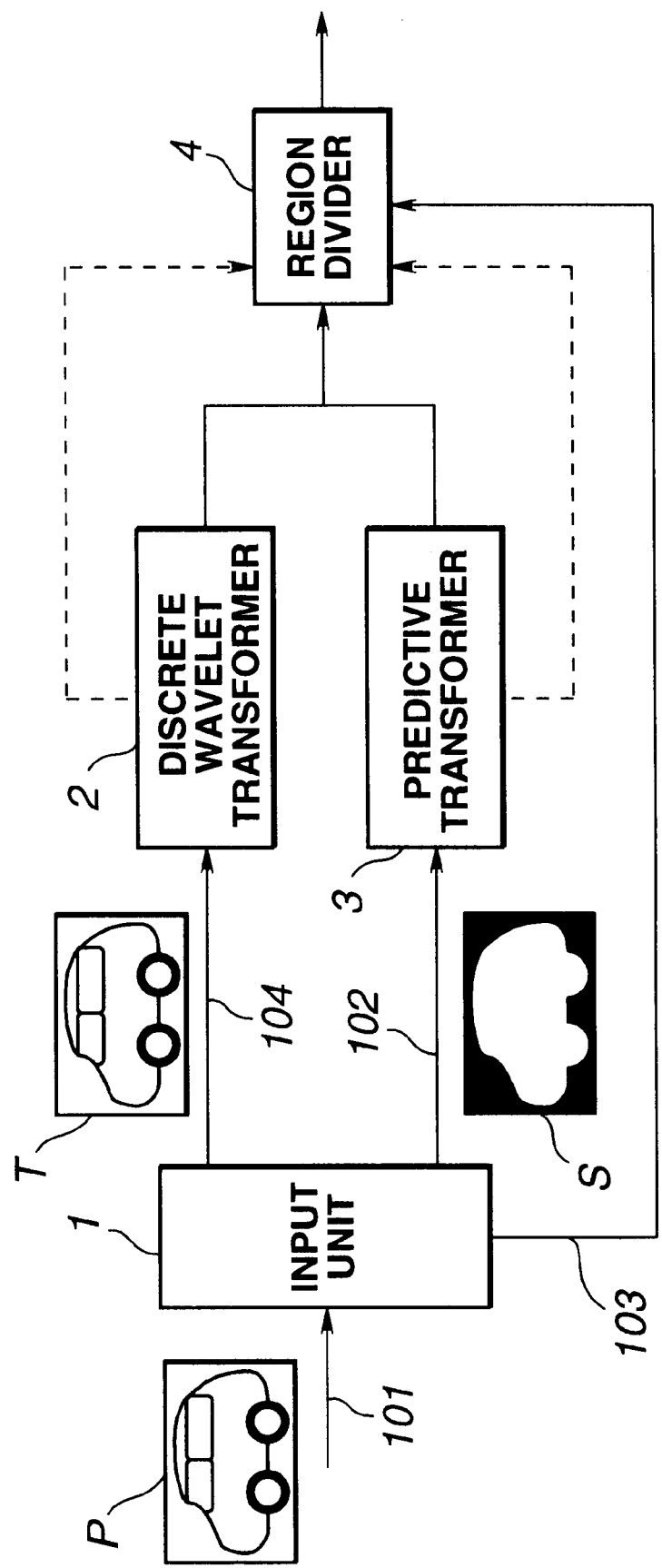
FIG. 1 is a block diagram illustrating the configuration of an image processing apparatus according to a first embodiment of the present invention.

FIG. 1 is a block diagram illustrating the configuration of an image processing apparatus according to a first embodiment of the present invention. In FIG. 1, an image P to be encoded is input to an input unit 1 via a data line 101. Although the object of the first embodiment is to encode an object (a car) included in the image P to be encoded, the input image is provided in the form of a rectangular region including a nonrectangular car. The object is one of a plurality of objects locally present in an original image comprising one picture frame. Accordingly, the size of the image P to be encoded is usually smaller than the one picture frame.

The input unit 1 detects the contoured shape of the car, serving as the nonrectangular object, from input image data representing the image P to be encoded, generates a binary image S in which a background portion (a portion other than the object) is represented by 0 and the portion of the object is represented by 1, and outputs the generated binary image S to data lines 102 and 103. A multivalue image T representing the object itself is also generated and output to a data line 104. Although the image T may be entirely the same as the input image P, the background portion may be represented by an appropriate value (for example, a value indicating white) in order to improve encoding efficiency in succeeding stages. However, since only the nonrectangular car portion is usually used in an image obtained by decoding encoded data of the image P, any value may be used for the background portion of the multivalue image T output to the data line 104 without causing any problems.

The multivalue image T is subjected to discrete wavelet transformation by a discrete wavelet transformer 2, and the binary image S is subjected to predictive transformation by a predictive transformer 3. Transformation coefficients obtained by the above-described transformation operations are input to a region divider 4 and are encoded. It is possible to transmit encoded data to an external apparatus having a decoding function via a transmission channel, or to temporarily store the encoded data in an internal or external storage unit and decode/reproduce the stored data after being read by the apparatus or another apparatus having a decoding function whenever necessary.

When generating the binary image S by the input unit 1, for example, edges may be extracted from the image P and a closed region formed by the edges may be used as the object, or the operator may directly assign the coutour of the object.

Processing performed after separating the image P to be encoded into the multivalue image T and the binary image S will now be described in detail.

The discrete wavelet transformer 2 performs discrete wavelet transformation for the input multivalue image T, and decomposes the image T into a predetermined number of frequency bands (hereinafter termed "subbands"). The discrete wavelet transformation will be briefly described, since it is a known transformation method.

Figure 2A:
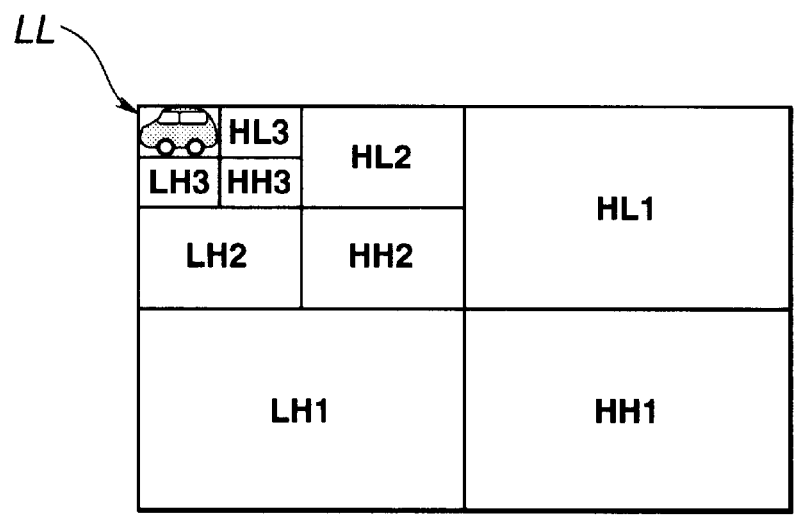
FIGS. 2A and 2B are diagrams illustrating the operation of a discrete wavelet transformer.
Figure 2B:
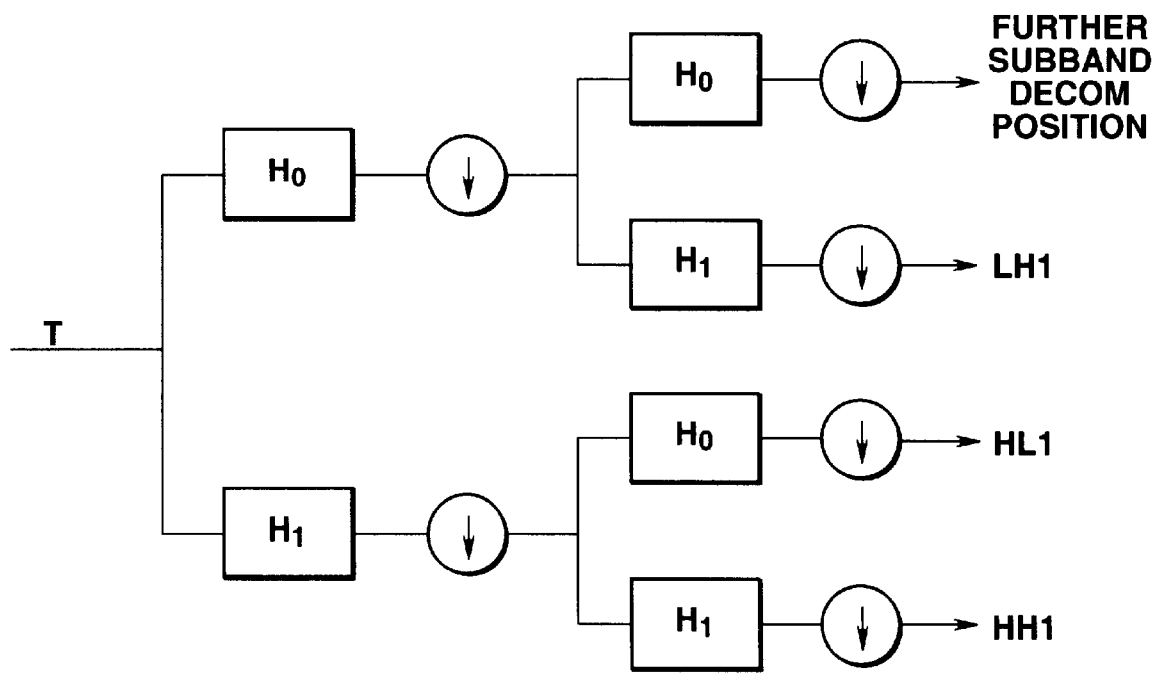

FIGS. 2A and 2B are schematic diagrams illustrating subbands generated by performing discrete wavelet transformation for the multivalue image T. In FIG. 2B, the input multivalue image T passes through a low-pass filter H0 and separately through a high-pass filter H1 in each of vertical and horizontal directions, and is decomposed into a plurality of frequency bands by being subjected to subsampling at every passage through a filter. FIG. 2A illustrates a result obtained after performing the above-described discrete wavelet transformation. In FIG. 2A, each of subbands HL1, HH1 and LH1 includes transformation coefficients representing the highest-subband component of the original image T, each of subbands HL2, HH2 and LH2 includes transformation coefficients representing the second-highest-subband component, and each of subbands HL3, HH3 and LH3 includes transformation coefficients representing the lowest-subband component in the first embodiment. A subband LL is configured by transformation coefficients representing an image obtained by reducing the original image T.

Each of the subbands thus obtained includes transformation coefficients having different frequency components, which are output to the region divider 4 in the following stage. In the first embodiment, the subband LL corresponding to a low-frequency component is first output followed by the subbands HL3, LH3 and HH3, then the subbands HL2, LH2 and HH2, and finally the subbands HL1, LH1 and HH1. By thus outputting subbands in the order of lower frequency components and sequentially obtaining encoded data, it is possible to hierarchically decode subbands in the order of lower frequency components, and to sequentially reproduce images having higher picture quality levels.

The region divider 4 which receives transformation coefficients corresponding to respective subblocks from the discrete wavelet transformer 2 extracts only coefficients having values within a predetermined range (each transformation coefficient whose most significant bit is present at the height of a bit plane within a predetermined range (at least $n_{max}$ (to be described later))) from the received transformation coefficients, and outputs information relating to each of the extracted transformation coefficients in the form of a bit-data string. This division processing can be considered as encoding of transforming the transformation coefficient of each of the subbands into another data format. The operation of the division divider 4 will now be described in detail.

Figure 3:
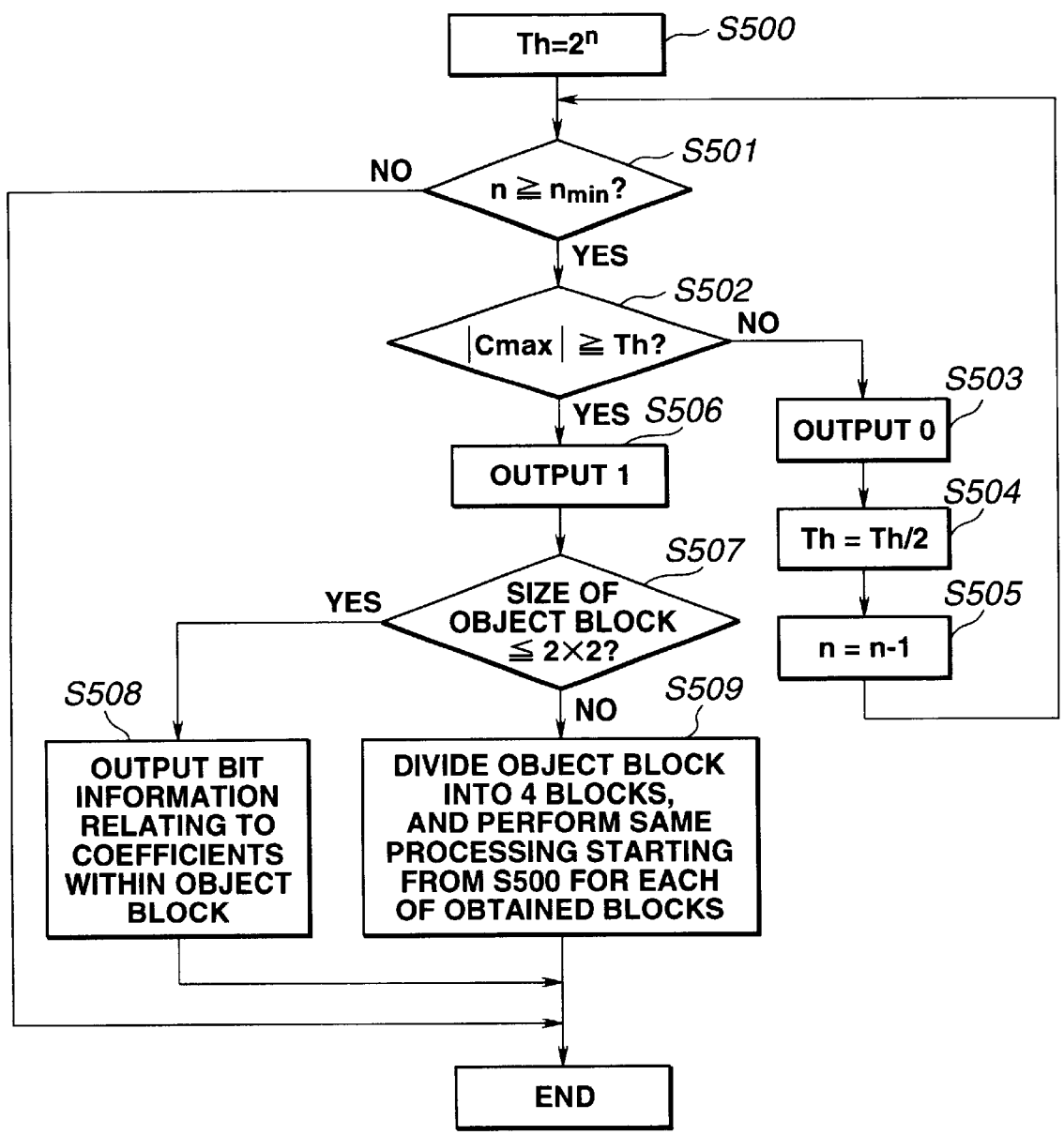
FIG. 3 is a flowchart illustrating the operation of a region divider.

FIG. 3 is a flowchart illustrating the operation of the region divider 4. The region divider 4 transforms the transformation coefficient within each of the sequentially input subbands into a bit-data string according to the procedure shown in FIG. 3.

As shown in FIG. 2A, the input subbands do not all have the same size. In order to simplify explanation, it is assumed that each subband has the initial size of an object block R shown in FIG. 5A. That is, the description will be provided assuming that the object block R is the first block processed in the region divider 4.

Figure 5C:
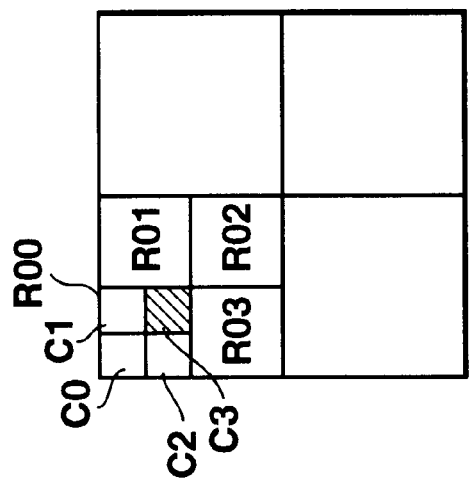
FIGS. 5A–5C are diagrams illustrating a manner of region division.
Figure 5B:
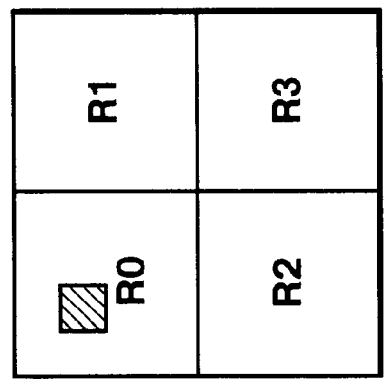
Figure 5A:
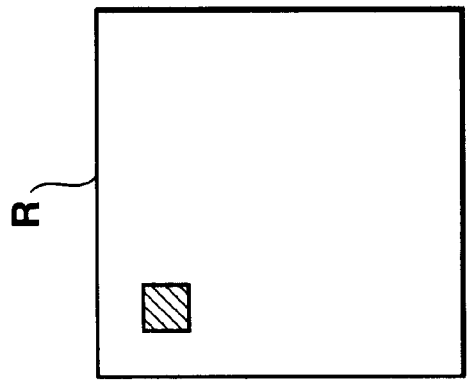

The size of C0–C3 shown in FIG. 5C and hatched portions shown in FIGS. 5A and 5B is the minimum size representing one transformation coefficient. The object block R is obtained after providing each subband with absolute values by the region divider 4. The region divider 4 separately holds a positive or negative sign corresponding to each transformation coefficient of each subband (the object block R), and utilizes the held sign as encoded data if necessary.

First, the maximum value $c_{max}$ for all transformation coefficients $c_i$ (i=0–63 in the case of FIG. 5A) within the object block R is obtained. Then, the following value $n_{max}$:

$$n_{max} = \text{floor}[\log_2(|c_{max}|)] \quad \text{(Equation 1),}$$

where floor (x) indicates the largest integer not exceeding x, is obtained, and is set as the initial value of the object-bit-plane number n.

In FIG. 3, in step S500, a threshold Th for the object block T is obtained using the value of the currently set number n:

$$Th = 2^n \quad \text{(Equation 2).}$$

Then, in step S501, it is determined if the current number n is equal to or larger than a predetermined minimum bit-plane number $n_{min}$. If the result of the determination in step S501 is affirmative, the process proceeds to step S502. If the result of the determination in step S501 is negative, the processing of the object block R is terminated.

In step S502, it is determined if the absolute value of the maximum value $c_{max}$ of the coefficients within the object block R satisfies the following condition:

$$|c_{max}| \geq Th \quad \text{(Equation 3).}$$

If the result of the determination in step S502 is affirmative, the process proceeds to step S506 assuming that a significant transformation coefficient is present within the object block R. If the result of the determination in step S502 is negative, the process proceeds to step S503, where bit data "0" for indicating the absence of a significant transformation coefficient within the object block R is output.

Then, in step S504, the value of the threshold Th is updated to Th/2. Then, in step S505, the value of n is decremented by one (the height of the bit plane serving as the threshold is decremented by one), and the process returns to step S501.

In step S506, bit data "1" indicating the presence of a significant transformation coefficient within the object block R is output.

In step S507, it is determined if the size of the current object block R is equal to or less than a predetermined size (a size of 2×2 in the first embodiment). If the result of the determination in step S507 is affirmative, the process proceeds to step S508. If the result of the determination in step S507 is negative, the process proceeds to step S509.

In step S508, bit data for bit planes from the n-th bit plane to the $n_{min}$-th bit plane which represent all coefficients (2×2=4 transformation coefficients in the first embodiment) within the object block R is output together with positive and negative signs corresponding to the respective coefficients.

In step S509, the object block R is further divided into 4 smaller object blocks $R_m$ because the object block R has a size equal to or larger than 2×2 and therefore can be further divided. The above-described processing for the object block R starting from step S500 is also performed for each of the object blocks $R_m$.

The above-described procedure will be described illustrating an example shown in FIGS. 5A–5C. FIG. 5A is a diagram illustrating the object block R defined as a block which is the first processed (each subband shown in FIG. 2A). It is considered that the object block R in the first embodiment comprises 8×8 transformation coefficients.

Within this object block R, one significant transformation coefficient where the maximum bit is present is present in a bit plane within a predetermined range (the hatched transformation coefficient having a value "40"). This transformation coefficient has a maximum value within the block R. Accordingly, other transformation coefficients are considered to be nonsignificant and to have a value "0". Although the picture quality is thereby more or less degraded, no problem arises because the level of the degradation is within tolerance. If the processing of sequentially dividing the object block R into object blocks $R_m$ is performed according to the procedure shown in FIG. 3, the object block is divided in the sequence of FIGS. 5A→5B→5C. FIG. 4 illustrates bit data sequentially output according to the above-described division processing.

In the above-described processing, n=5, and $n_{min}$=3. By executing this processing, it is possible to output a bit-data string as shown in FIG. 4 which can represent the position and the value of each coefficient from a block comprising a plurality of multivalue transformation coefficients. Arrows ①, ② and ③ shown in FIG. 4 indicate the sequence of generation and output to the succeeding stage of bit data according to this processing. Bits are output in the sequence of the arrows ①, ② and ③.

The manner of the above-described division processing will now be described.

When the object block is the block shown in FIG. 5A, i.e., the object block R, first, it is determined if a coefficient where a significant bit is present is present in the bit plane at the fifth bit of the multivalue transformation coefficients. It can be detected that such a coefficient (significant coefficient) is present at the second pixel from the left and the second pixel from the top.

Then, in the state shown in FIG. 5A, the object block R is divided into 4 blocks as shown in step S509 in order to determine the position of the significant coefficient. As a result, object blocks R0–R3 shown in FIG. 5B are obtained. At that time, bit data "1" indicating that the object block R is divided into four blocks is output.

Then, the same processing starting from step S500 is also performed for each of the object blocks R0–R3.

First, the above-described processing is performed for the object block R0. In this block R0, since it is determined in step S502 that "a significant coefficient is present", this block is further divided into four blocks R00–R03. At that time, bit data "1" indicating that the object block R0 is divided into four blocks is output.

Since the block R0 is further divided into four blocks, the processing starting from step S500 is also performed for each of the blocks R00–R03 before processing the blocks R1–R3.

When the above-described processing is performed for the object block R00, the process proceeds from step S507 to step S508 because the size of the object block R00 is 2×2. Accordingly, as for the block R00, data for the fifth–third bits coresponding to respective coefficients within the block, i.e., 3-bit data "000", "000", "000" and "101", each indicating presence/absence of a significant coefficient, and 1-bit data "0", "0", "0" and "0", each indicating the positive/negative sign of each coefficient are also output in the sequence shown in FIG. 4. These data constitute the bit-data string indicated by the arrow ①.

Since the entirety of the division processing relating to the block R00 is terminated in the above-described manner, then, processing for the block R01 is performed. There is no significant coefficient in the third–fifth bits corresponding to respective coefficients within the block R01. Hence, for n=3, 4 and 5, "0" indicating "absence of a significant coefficient" is output until the number n becomes less than 3 by repeating the processing of steps S502, and S503–S505. Then, "000", "000" and "000" are output by performing the same processing for the blocks R02 and R03. These data constitute the bit-data string represented by the arrow ②.

Since the entirety of the division processing relating to the block R00 (R00–R03) is terminated in the above-described manner, then, the blocks R1–R3 are processed. There is no significant coefficient in the third–fifth bits corresponding to respective coefficients within the blocks R1–R3. Hence, "000", "000" and "000" are output as in the case of the blocks R01–R04. These data constitute the bit-data string represented by the arrow ③.

Wavelet transformation coefficients of an ordinary texture image are spatially localized. Hence, by replacing the position of a significant coefficient with bit information indicating presence/absence of region division, the position and the value of the coefficient can be encoded with a very small number of bits.

Next, a description will be provided of a case of encoding the shape image S.

Figure 6:
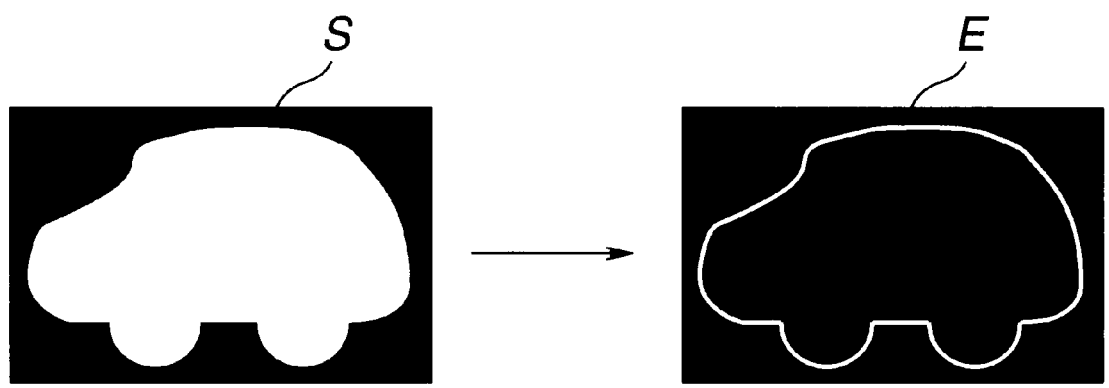
FIG. 6 is a diagram illustrating a manner of forming a binary image E.

In FIG. 1, the shape image S output from the input unit 1 is transformed by the predictive transformer 3 into a data string having values "1" only at a contour portion of the image. That is, as shown in FIG. 6, the predictive transformer 3 outputs predictive error, where only the contour portion of the input shape image S is represented by a value "1", as a binary image E. As shown in the following (Equation 4), this predictive error is generated and output by obtaining exclusive OR between adjacent pixels:

$$e(x)=s(x-1) \text{ [exclusive } OR]s(x) \tag{Equation 4}$$

where s(x) is an object pixel to be subjected to predictive transformation in the shape image S, e(x) is the value of each pixel, i.e., predictive error, of the image E obtained by this prediction, and x is the index of each pixel. In the case of x=0, s(x−1) cannot be obtained. In the first embodiment, however, the value of s(x−1) is set to 0 assuming that this position is out of the object. The binary image E obtained by the above-described prediction is output to the region divider 4 as in the above-described case of the texture image T.

In the first embodiment, a description has been provided assuming that the binary image E is generated by configuring a contour portion by edges in the horizontal direction and sequentially processing the image in the horizontal direction. However, the present invention is not limited to such an approach. That is, when it is intended to configure a contour portion by edges in the vertical direction, prediction may be sequentially performed using (Equation 4). When it is intended to extract a complete contour portion (the binary image E), results obtained by performing prediction according to (Equation 4) both in the vertical and horizontal directions may be synthesized according to OR processing or the like.

The binary image E obtained from the predictive transformer 3 is output to the region divider 4. The region divider 4 can process the binary image E according to substantially similar steps as in the above-described case by dealing with the binary image E similarly as the subbands output from the discrete wavelet transformer 2, and outputs division information indicating the result of division of the binary image E, and bit information obtained by the above-described transformation.

However, in contrast to transformation coefficients (the multivalue image) within the subbands output from the discrete wavelet transformer 2, the predictive error value within the binary image E is limited to 0 or 1. Accordingly, by separately receiving information indicating whether data input to the divider 4 constitutes a subband generated from the discrete wavelet transformer 2 or the binary image E generated from the predictive transformer 3 from the input unit 1 via the data line 103, the region divider 4 switches region division processing and the method of outputting a bit-data string.

Next, a description will be provided of specific processing when performing division processing of the binary image E obtained from the predictive transformer 3 with the region divider 4.

An approach of outputting encoded data by dividing the binary image E input from the predictive transformer 3 into regions differs from the approach of outputting encoded data shown in FIG. 4 by dividing each subband input from the discrete wavelet transformer 2 into regions in the following two points.

For the first point, the entirety of the binary image E is set as the above-described object block R at initialization. The object block R in this approach indicates a block having a size to be first processed in the region divider 4. That is, the size of the binary image E is not always the size shown in FIG. 5A.

Then, the value $n_{max}$ is set as:

$$n_{max}=0 \quad \text{(Equation 5)},$$

and the object-bit-plane number n and the minimum-bit-plane number $n_{min}$ are set to 0.

For the second point, since it is only necessary to divide a block comprising a 1-bit predictive error coefficient in the processing of dividing the binary image E, only data indicating 1 bit representing predictive error is output instead of outputting 3 bits representing presence/absence of a significant coefficient and 1 bit representing a positive/negative sign as shown in FIG. 4.

More specifically, if it is assumed that the object block R shown in FIG. 5A is the binary image E (in this case, it is considered that the hatched region c3 represents a predictive error value "1", and other regions represent "0"), a bit-data string to be output shown in FIG. 5C includes:

c0=c1=c2=0 c3=1

R01=R02=R03=0

R1=R2=R3=0.

In consideration of three "1"s in the arrow ① indicating whether or not a significant coefficient is present within the object block R, or R0–R3, or R00–R03, a bit-data string "1110001000000" is output in the sequence of the arrows ①, ② and ③. Since this approach is basically the same as the approach of generating a bit-data string (encoded data) by dividing multivalue transformation coefficients (subband) into regions, except the above-described two points, further description thereof will be omitted.

FIGS. 7A–7F are schematic diagrams illustrating data formats of encoded data generated by encoding the multivalue image T and the shape image S in the above-described manner.

FIG. 7A illustrates the entire configuration of encoded data finally output from the image processing apparatus of the first embodiment. The encoded data includes header information and a code stream.

As shown in FIG. 7B, the header information includes geometric information which is necessary when decoding the size or the like of the encoded image P, and parameters necessary in transformation of the level of discrete wavelet transformation (DWT), the type of the filter, and the like.

As shown in FIG. 7C, the code stream grossly includes a portion relating to the shape image S, and a portion relating to the multivalue image T. A header indicating the corresponding type is provided at the head of each of the portions.

As shown in FIG. 7D, the shape data includes a bit-data string obtained by dividing the binary image E into regions in the above-described manner.

The texture data includes the number $n_{max}$ of the highest bit plane where a significant coefficient is present from among multivalue bits indicating transformation coefficients within each subband. In the first embodiment, the number $n_{min}$ is common to each subband to be encoded. However, information relating to the number $n_{min}$ may also be included in encoded data as in the case of the number $n_{max}$. Thus, respective bands may have different values of $n_{min}$. As for the shape data, since each encoded data (each coefficient in the binary image E) is represented as a binary value, information relating to the values $n_{max}$ and $n_{min}$ is unnecessary.

FIG. 7E illustrates the configuration of the code stream of the multivalue image T. The code stream is further configured by subbands after discrete wavelet transformation. Names LL–HH1 are the same as the names of the subbands shown in FIG. 2A. By thus outputting subbands in the sequence of higher frequency components, progressive encoding can be performed.

As shown in FIG. 7F, each subband comprises a bit stream where two types of bits, i.e., a division bit and a coefficient bit, are alternately present. The division bit corresponds to the bit output in step S503 or S506 shown in the flowchart of FIG. 3, the coefficient bit corresponds to the bit output in step S508.

Next, a description will be provided of a method of decoding encoded data obtained in encoding processing in the first embodiment.

FIG. 8 is a block diagram illustrating the configuration of an apparatus for decoding encoded data obtained in encoding processing in the first embodiment. The operation of the apparatus will now be described in detail with reference to FIG. 8.

As for the encoded data shown in FIGS. 7A–7F, which has been input from an external apparatus having the above-described encoding function via a transmission channel, or by being read from an internal or external storage unit, a header-information analyzer 6 recognizes necessary information relating to the size of the original image, and the like, and stores the recognized information as information necessary for decoding.

The header-information analyzer 6 also determines whether a part of the sequentially read code stream is data encoded as the multivalue image T or data encoded as the binary image S indicating the shape, and outputs the result of the determination to a switcher 7. When decoding the multivalue image T, the header-information analyzer 6 recognizes the value $n_{max}$ for each subband encoded as the multivalue image S from the code stream succeeding the header, and outputs the recognized value to a region divider 5. The value $n_{max}$ when encoding the binary image S is not included in the encoded data. Hence, when decoding encoded data of the binary image S, $n_{max}=0$ is automatically output to the region divider 5.

The code stream (see FIGS. 7C–7F) in the encoded data is also input to the region divider 5. The region divider 5 restores data immediately before being input to the region divider 4 shown in FIG. 1 (each subblock comprising transformation coefficients or the binary image E) from the bit-data string (including division bits, coefficient bits, predictive error bits and the like) obtained when the region divider 4 has divided each block in encoding processing.

Figure 9:
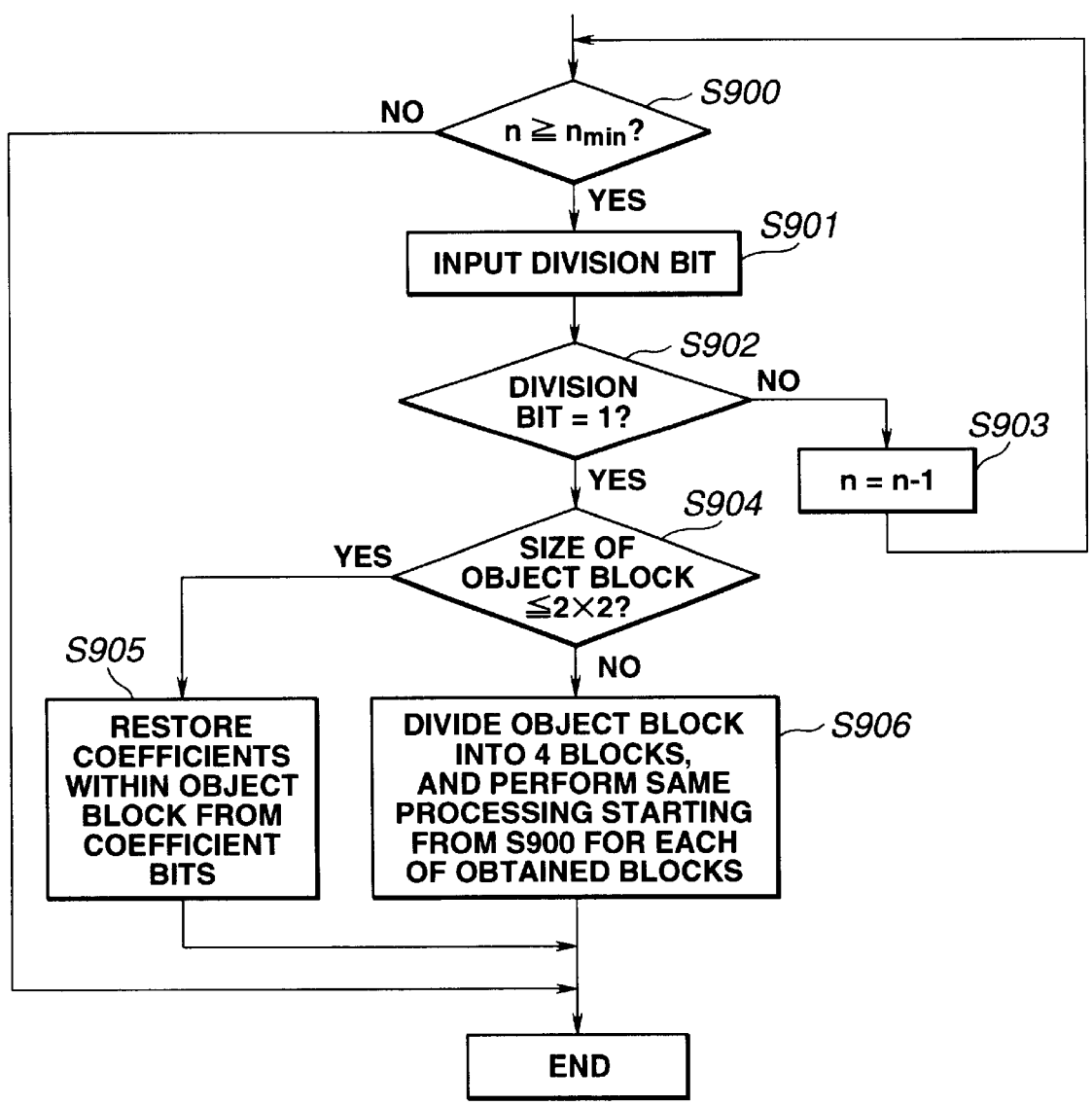
FIG. 9 is a flowchart illustrating the operation of the region divider of the decoder in the first embodiment.

The operation of the region divider 5 for reproducing the multivalue image T based on data obtained by encoding the multivalue image T will now be described with reference to the flowchart shown in FIG. 9. In the first embodiment, it is assumed that the order of encoding (performing region division of) a plurality of subbands at the encoding side is determined. Accordingly, the order of subbands to be decoded is uniquely determined.

First, a region for a subband is secured from the code stream corresponding to the subband. A region corresponding to the size of the subband is made an intial value of the object block R, all coefficients within this region are initialized to 0, and the value $n_{max}$ obtained from the header shown in FIG. 7E is made the initial value for the object bit plane n.

In step S900, it is determined if the number n is equal to or larger than a predetermined minimum bit-plane number $n_{min}$. If the result of the determination in step S900 is negative, the processing for the object block R is terminated.

If the result of the determination in step S900 is affirmative, the process proceeds to step S901, where one division bit is read from the code stream.

In step S902, it is determined if the read division bit equals 1. If the result of the determination in step S902 is negative, the process proceeds to step S903, where the number n is decremented by one, and the process returns to step S900.

In step S904, it is determined if the size of the object block R is equal to or less than a predetermined size, for example, 2×2 pixels in the vertical and horizontal directions. If the result of the determination in step S904 is affirmative, the process proceeds to step S905, where coefficient bits are read from the code stream and all coefficients within the region are restored.

If the result of the determination in step S904 is negative, the process proceeds to step S906, where the current object block R is divided into four small regions Rm, and the same processing starting from step S900 is also performed sequentially for each of the regions Rm.

Figure 10:
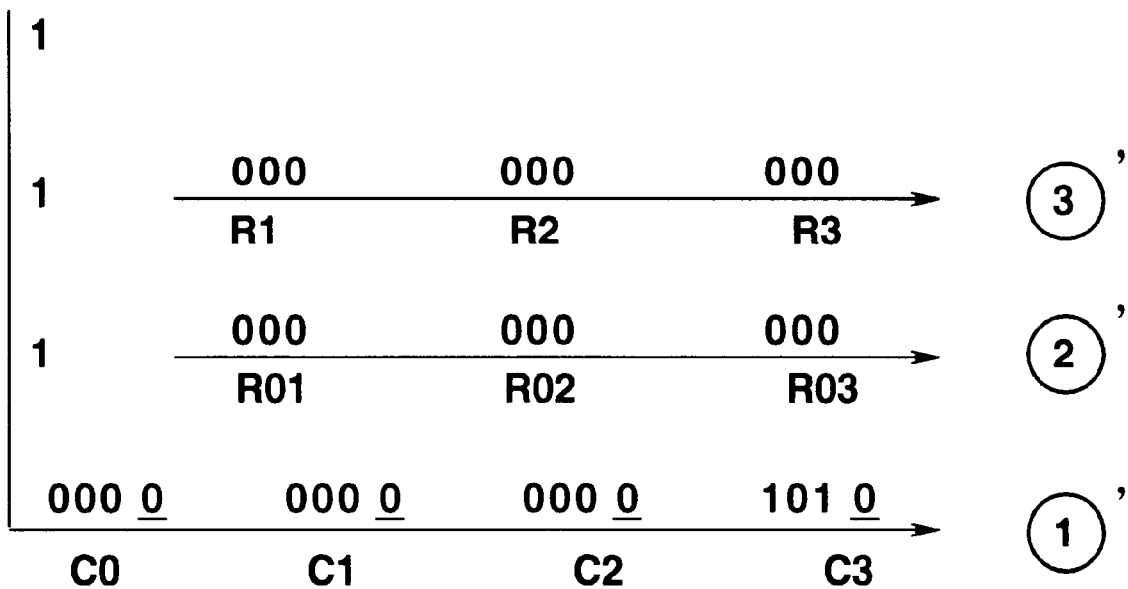
FIG. 10 is a diagram illustrating a bit-data string processed during decoding processing.

The above-described procedure will now be described in detail illustrating an example. FIGS. 11A–11D illustrate a state of restoring the object block R, and FIG. 10 illustrates a sequentially input code stream (bit-data stream) relating to the object block R. In this description, it is assumed that the bit-data string shown in FIG. 10 is the same as the bit-data string shown in FIG. 4.

Arrows ①', ②' and ③' shown in FIG. 10 indicate the order of input of the bit-data string, i.e., respective bits are input in the order of ①'-②'-③'.

Figure 11:
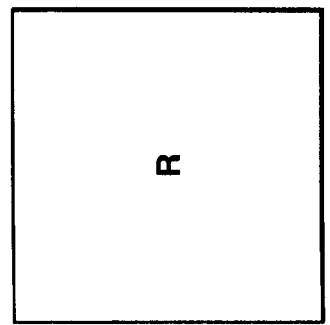
FIGS. 11A–11D are diagrams illustrating a manner of restoring an image by region division.

As shown in FIG. 11A, the object block R is initialized to 0 and is not divided. In step S901, division information "1" for the first bit at the arrow ①' is input. It is thereby possible to determine that at least one significant coefficient is present in the current bit plane n within the block R. Accordingly, in step S906, the block R is divided into four small blocks R0–R3, to provide the state shown in FIG. 11B.

Then, processing of decoding the block R0 is performed. First, in step S901, the second bit (the division bit "1") at the arrow ①' is input. It is thereby possible to determine that at least one significant pixel is present in transformation coefficients within the block R0. Accordingly, the block R0 is further divided into four small blocks R00–R03, to provide the state shown in FIG. 11C.

In this state, since the first small block R0 is further divided into small blocks, processing of decoding the blocks R00–R03 is performed preferentially before processing of dividing the blocks R1–R3. Priority in the decoding processing is the same as in the encoding processing. Hence, the same division processing as in the encoding processing can be performed.

First, for the block R00, processing is performed starting from step S900. When a division bit indicated in the third bit (division bit "1") at the arrow ①' has been input in step S901, it can be determined that at least one significant bit is present within the block R00. However, since the size of the block R00 is 2×2 pixels in the vertical and horizontal directions, the process proceeds to step S905 without further performing division, and the remaining bit-data string at the arrow ①' is dealt with as values indicating transformation coefficients.

Since it is known that $n_{max}=5$ from information included in the encoded data and the value $n_{min}$ is known in advance, the number of bits representing each transformation coefficient can be determined. Accordingly, the first three bits in the input bit-data string are dealt with as values indicating the third through fifth bits of c0, and the succeeding one bit is dealt with as a positive/negative sign for the transformation coefficient. Thus, a transformation coefficient "0" is restored for each of c1–c3, and a transformation coefficient "40" is restored for c3 (see FIG. 11D).

Since the block R00 has now been entirely restored (divided), it can be understood that the bit-data string input at the arrow ②' is for restoring (dividing) the block R01 and the succeeding blocks.

Since the first bit input for restoring the block R01 is not "1" and, instead, the first three bits are represented by "000", it can be understood that no significant bit (i.e., "1") is present in the fifth through third bits of the block R01. Accordingly, the block R01 is restored by making all transformation coefficients within the block R01 0. Similarly, the blocks R02 and R03 are processed, and transformation coefficients 0 are restored within each block.

By further performing the same processing based on the bit-data string at the arrow ③', transformation coefficients 0 are restored in each of the blocks R1–R3. The above-described operation is also performed when restoring the binary image E encoded as shape information of the object (the nonrectangular car in the first embodiment). In this case, however, the number $n_{max}$ is initialized to 0 as in the encoding processing, and no positive/negative-sign bit is included. Since the decoding processing is the same as in the case of the texture image except the above-described points, further description thereof will be omitted.

Coefficients (respective subbands representing the multivalue image T, or the binary image E) restored according to the above-described procedure are selectively output to an inverse discrete wavelet transformer 8 or an inverse predictive transformer 9 via the switcher 7. This switching is performed based on the result of the above-described analysis of the encoded data by the header-information analyzer 6. That is, the header-information analyzer 6 performs control so that, when restored coefficients input to the switcher 7 are determined to correspond to respective subbands obtained by performing discrete wavelet transformation of the multivalue image T, the restored coefficients are output to the inverse discrete wavelet transformer 8, and when restored coefficients input to the switcher 7 are determined to correspond to the binary image E obtained by performing predictive transformation of the binary image S, the restored coefficients are output to the inverse predictive transformer 9.

By performing inverse discrete wavelet transformation based on data for each of the input subbands, the inverse discrete wavelet transformer 8 reproduces the multivalue image T. The inverse predictive transformer 9 reproduces the binary image E based on the input binary image E, i.e., predictive error.

The multivalue image T and the binary image S restored in the above-described manner are restored and output as one image by a synthesizer 10 present in the following stage. More specifically, an effective portion in the regtangular multivalue image T is determined based on the shape indicated by the binary image S, and only the multivalue image T corresponding to the effective portion is recognized as the image of the object. It is thereby possible to efficiently encode a nonrectangular multivalue image. The encoding method of the first embodiment can, of course, also encode a rectangular image.

Figure 14:
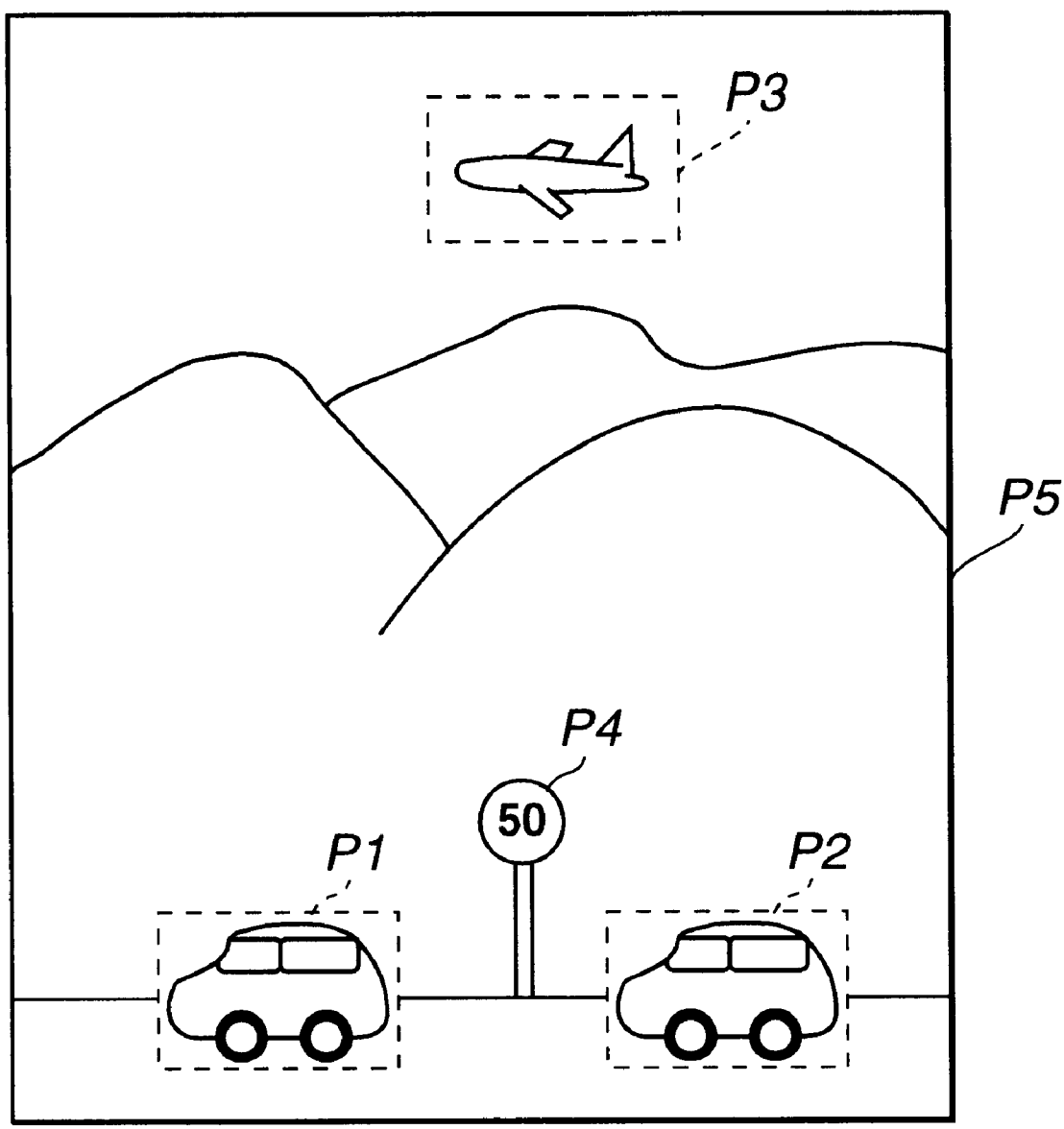
FIG. 14 is a diagram illustrating the entirety of an image before encoding or after decoding.

As shown in FIG. 14, the object reproduced in the above-described manner can be used as a partial image in an image of one picture frame having a size larger than the object. That is, by separately encoding respective objects P1–P4 (nonrectangular) and background P5 (rectangular) in the above-described manner as components constituting the picture frame, it is possible to reproduce an image of one picture frame which includes only necessary objects (for example, the object P3 and the background P5).

When performing the above-described encoding/decoding processing, the encoding side includes separation means for manually or automatically separating each object (image P) from the image of one picture frame as shown in FIG. 14 at a stage before the input unit, and the decoding side includes synthesis means for synthesizing respective objects synthesized by the synthesizer 10 within the apparatus.

The above-described encoding function and decoding function may be present in different apparatuses or in a single apparatus, depending on the requirement.

According to the first embodiment, when encoding a multivalue image of an object having an arbitrary shape, it is possible to efficiently encode shape information (a binary image S) and an actual multivalue image (an image T) of the object. That is, by using discrete wavelet transformation, it is possible to remove redundancy in the spatial region possessed by the multivalue image T. By using predictive transformation, it is possible to also spatially deviate respective transformation coefficients of a binary image, serving as shape information. Accordingly, it is possible to efficiently encode a small number of significant coefficients and a large number of other nonsignificant coefficients in region division processing commonly performed at a rear stage. Particularly, the present invention can provide an efficient encoding method in which a method itself for dividing a region including these coefficients is made encoded data.

In the first embodiment, although a description has been provided of an approach of encoding a rectangular or nonrectanguler multivalue image and shape information relating to the multivalue image, the present invention is not limited to such an approach. That is, the present invention also includes an approach of performing division processing after transforming images (the image T and the image S in the first embodiment) obtained from the same multivalue image using different transformation methods (e.g. discrete wavelet transformation and predictive transformation).

Second Embodiment

The shape of the object is represented by a binary image in the first embodiment. In a second embodiment of the present invention, however, by representing the shape of the object by a multivalue image, it is possible to perform see-through synthesis in image synthesis performed between objects during decoding processing. This method will now be more specifically described.

Figure 12:
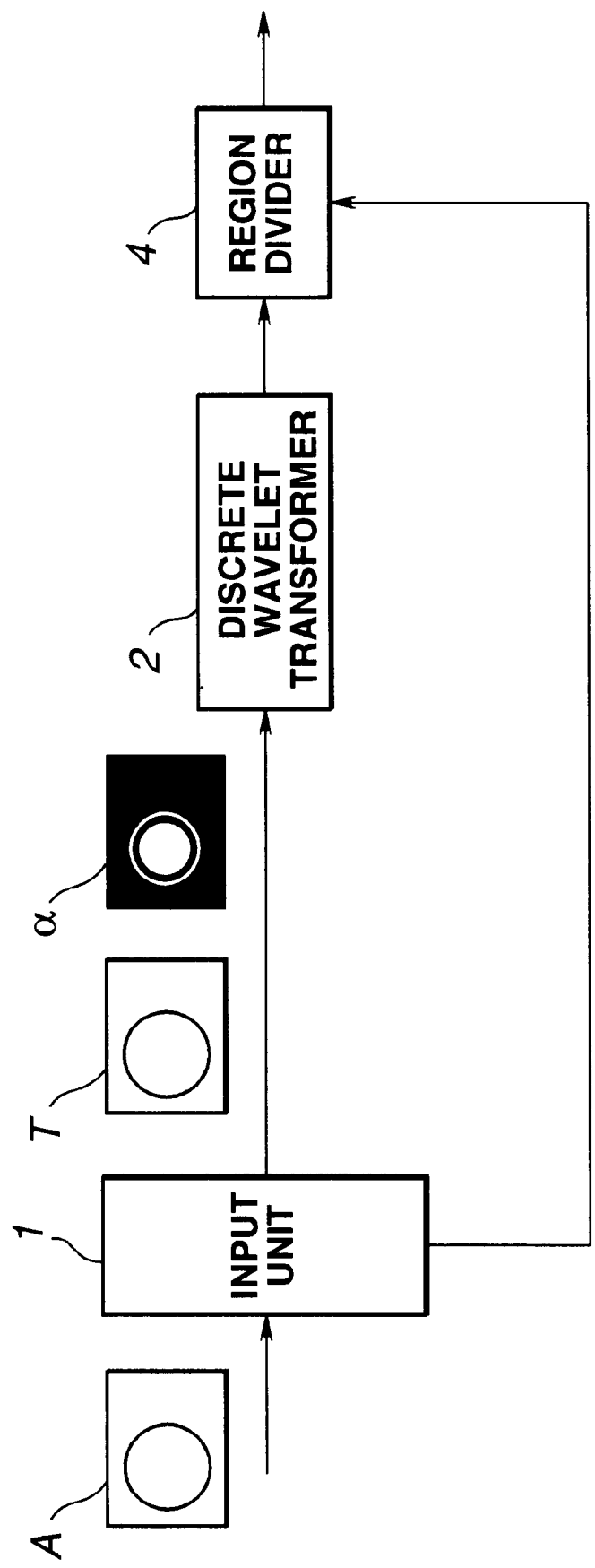
FIG. 12 is a block diagram illustrating the configuration of an image processing apparatus according to a second embodiment of the present invention.

FIG. 12 is a block diagram illustrating the configuration of an image processing apparatus according to the second embodiment. In the second embodiment, a so-called $\alpha$ channel which represents the synthesis ratio of an image input to an input unit 1 to another portion can be assigned in synthesis processing.

In FIG. 12, a multivalue image T and an $\alpha$ channel $\alpha$ are generated from the image input to the input unit 1. The $\alpha$ channel $\alpha$ is represented, for example, by a multivalue image having 4-bit gradation levels. If the value of a coefficient at a position (i,j) in the multivalue image T before encoding is represented by $x_{ij}$, the value of the pixel at the position (i,j) in the multivalue image T after decoding is represented by $x'_{ij}$, and the value of the pixel at the position (i,j) in the multivalue image T when finally synthesizing the multivalue image T with another multivalue image is represented by $x''_{ij}$, the value of the pixel $x''_{ij}$ is represented by:

$$x''_{ij} = (\alpha_{ij}/15) x'_{ij} \quad \text{(Equation 6).}$$

In FIG. 12, the value of the $\alpha$ channel is large at a central portion of a circular object, and small at peripheral portions. Accordingly, when synthesizing this object with another multivalue image, peripheral portions of the object are represented by a light color in the obtained image.

Both the multivalue image T and the $\alpha$ channel $\alpha$ are transformed by a discrete wavelet transformer 2. This processing is the same as the processing in the first embodiment.

Then, the position and the value of each transformation coefficient are encoded by a region divider 4. When dividing the $\alpha$ channel $\alpha$, it is desirable that the same value as the original value before encoding is obtained after being decoded, in consideration of the role of the $\alpha$ channel. Accordingly, in the second embodiment, the minimum bit-plane number $n_{min}$ is set to 0. Thus, the value of the $\alpha$ channel $\alpha$ is completely restored at decoding, provided that transformation in the discrete wavelet transformer 2 satisfies complete reconfiguration conditions.

FIGS. 13A–13F are schematic diagrams illustrating data formats according to the second embodiment. The entire configuration is the same as the configuration in the first embodiment. In the second embodiment, however, since wavelet transformation is also used for shape data, information relating to the maximum bit plane and the wavelet transformation level is included within the texture header. Since it is apparent that the minimum bit plane is 0, information relating to the minimum bit plane is not included.

The shape data has the same structure as the texture data, and comprises data relating to respective subbands including division bits and coefficient bits. Since decoding processing in the second embodiment is the same as the decoding processing of texture data in the first embodiment, further description thereof will be omitted.

The multivalue image T and the $\alpha$ channel $\alpha$ decoded in the above-described manner are sequentially stored at the decoding side. When synthesizing the multivalue image T with another image, image synthesis is performed while referring to the decoded $\alpha$ channel $\alpha$.

In the second embodiment, wavelet transformation is performed for the $\alpha$ channel $\alpha$, serving as shape information. However, when the value of the $\alpha$ channel $\alpha$ is limited, any other appropriate transformation method, such as predictive transformation, may also be used. Particularly when the $\alpha$ channel has a binary value, encoding efficiency is not so high because the range of coefficients increases by performing wavelet transformation. In such a case, higher compression efficiency can be obtained by performing the processing in the first embodiment.

According to the second embodiment, when encoding a multivalue image of an object having an arbitrary shape, it is possible to efficiently encode shape information (an $\alpha$ channel $\alpha$) and an actual multivalue image (an image T) of the object. That is, by using discrete wavelet transformation, it is possible to remove redundancy in the spatial region possessed by the multivalue image T and the $\alpha$ channel $\alpha$. Accordingly, it is possible to efficiently encode a small number of significant coefficients and a large number of other nonsignificant coefficients in region division processing commonly performed at a rear stage. Particularly, the present invention can provide an efficient encoding method in which a method itself for dividing a region including these coefficients is made encoded data.

As in the first embodiment, the object reproduced in the above-described manner can be used as a partial image in an image of one picture frame having a size larger than the object. That is, by separately encoding respective objects in the above-described manner as components constituting the picture frame, it is possible to reproduce an image of one picture frame which includes only necessary objects.

When performing the above-described encoding/decoding processing, the encoding side includes separation means for manually or automatically separating each object (image P) from the image of one picture frame as shown in FIG. 14 at a stage before the input unit, and the decoding side includes synthesis means for synthesizing respective objects synthesized by the synthesizer 10 within the apparatus.

The above-described endoding function and decoding function may be present in different apparatuses or in a single apparatus depending on the requirement.

MODIFICATION

The present invention may be applied to a system comprising a plurality of apparatuses (such as a host computer, an interface apparatus, a reader, a printer and the like), or to an apparatus comprising a single unit (such as a copier, a facsimile apparatus or the like).

The present invention is not limited to apparatuses and methods for realizing the above-described embodiments, but may also be applied to a case in which program codes of software for realizing the above-described embodiments are supplied to a computer (a CPU (central processing unit) or an MPU (microprocessor unit)) within the system or the apparatus, and the computer of the system or the apparatus operates respective devices in accordance with the program codes in order to realize the above-described embodiments.

In this case, the program codes themselves of the software realize the functions of the above-described embodiments, so that the program codes themselves, and means for supplying the computer with the program codes, more specifically, a storage medium storing the program codes, constitute the present invention.

For example, a floppy disk, a hard disk, an optical disk, a magnetooptical disk, a CD(compact disc)-ROM(read-only memory), a magnetic tape, a nonvolatile memory card, a ROM or the like may be used as the storage medium for storing the program codes.

The present invention may be applied not only to a case in which the functions of the above-described embodiments are realized by control of respective devices by the computer only according to the supplied program codes, but also to a case in which the functions of the above-described embodiments are realized by cooperation of the program codes with an OS (operating system) operating in the computer, any other application software, or the like.

The present invention may also be applied to a case in which, after storing the supplied program codes into a memory provided in a function expanding board of the computer or in a function expanding unit connected to the computer, a CPU or the like provided in the function expanding board or the function expanding unit performs a part or the entirety of actual processing based on instructions of the program codes, and the functions of the above-described embodiments are realized by the processing.

As described above, according to the present invention, it is possible to efficiently encode information relating to an arbitrary shape, i.e., a rectangular or non-rectangular shape. It is also possible to efficiently encode a plurality of types of image data obtained from the same multivalue image.

The individual components designated by blocks in the drawings are all well known in the image processing apparatus and method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:

input means for inputting a multivalue image;

first transformation means for transforming the multivalue image input by said input means with a first transformation method and for generating first transformation coefficients;

second transformation means for transforming shape information indicating a shape of the multivalue image transformed by said first transformation means with a second transformation method different from the first transformation method and for generating second transformation coefficients; and encoding means for encoding each of blocks configured by the first transformation coefficients and blocks configured by the second transformation coefficients using a common encoding method.

2. An image processing apparatus according to claim 1, wherein said encoding means generates encoded data including information indicating positions of efficient transformation coefficients by repeating division processing for each of the blocks configured by the first transformation coefficients and the blocks configured by the second transformation coefficients, and outputs the encoded data.

3. An image processing apparatus according to claim 2, wherein said encoding means determines the efficient transformation coefficients by comparing the input first transformation coefficients with a predetermined threshold.

4. An image processing apparatus according to claim 2, wherein the efficient transformation coefficients are coefficients whose values are within a predetermined threshold range.

5. An image processing apparatus according to claim 2, wherein encoded data corresponding to the first transformation coefficients output from said encoding means include the values of the efficient transformation coefficients.

6. An image processing apparatus according to claim 1, wherein the first transformation method executes discrete wavelet transformation, and wherein the second transformation method executes predictive encoding.

7. An image processing apparatus according to claim 1, wherein the shape information is represented by a binary image.

8. An image processing apparatus according to claim 1, wherein the shape information is represented by a multivalue image, and is multivalue information representing a synthesis ratio of the multivalue image, obtained by the transformation by said first transformation means, to another multivalue image.

9. An image processing apparatus according to claim 1, further comprising:

decoding means for decoding encoded data corresponding to the first and second transformation coefficients; and image synthesis means for synthesizing an image obtained by decoding the encoded data corresponding to the first transformation coefficients with another image based on shape information obtained by decoding the encoded data corresponding to the second transformation coefficients.

10. An image processing method comprising:

an input step of inputting a multivalue image;

a first transformation step of transforming the multivalue image with a first transformation method and generating first transformation coefficients;

a second transformation step of transforming shape information indicating a shape of the multivalue image transformed in said first transformation step with a second transformation method different from the first transformation method and generating second transformation coefficients; and an encoding step of encoding each of blocks configured by the first transformation coefficients and blocks configured by the second transformation coefficients using a common encoding method.

11. A storage medium storing an image processing program so as to be readable by a computer, said image processing program comprising:

an input step of inputting a multivalue image;

a first transformation step of transforming the multivalue image with a first transformation method and generating first transformation coefficients;

a second transformation step of transforming shape information indicating a shape of the multivalue image transformed in said first transformation step with a second transformation method different from the first transformation method and generating second transformation coefficients; and an encoding step of encoding each of blocks configured by the first transformation coefficients and blocks configured by the second transformation coefficients using a common encoding method.

* * * * *

UNITED STATES PATENT AND TRADEMARK OFFICE
CERTIFICATE OF CORRECTION

PATENT NO. : 6,614,933 B1
APPLICATION NO. : 09/310130
DATED : September 2, 2003
INVENTOR(S) : Makoto Sato It is certified that error appears in the above-identified patent and that said Letters Patent is hereby corrected as shown below:

COLUMN 14

Line 22, "$\propto$ channel" should read --$\alpha$ channel--;

Line 25, "$\propto$ channel" should read --$\alpha$ channel--;

Line 26, "$\propto$" should read --$\alpha$--;

Line 27, "$\propto$ channel $\propto$" should read --$\alpha$ channel $\alpha$--;

Line 38, "$(x''_{ij}(\propto_{ij}/15)x'_{ij}$" should read --$(x''_{ij}(\alpha_{ij}/15)x'_{ij}$--;

Line 39, "$\propto$ channel" should read --$\alpha$ channel--;

Line 44, "$\propto$ channel $\propto$" should read --$\alpha$ channel $\alpha$--;

Line 50, "$\propto$ channel $\propto$," should read --$\alpha$ channel $\alpha$,--;

Line 52, "$\propto$ channel." should read --$\alpha$ channel.--; and

Line 55, "$\propto$ channel $\propto$" should read --$\alpha$ channel $\alpha$--.

COLUMN 15

Line 7, "$\propto$ channel $\propto$" should read --$\alpha$ channel $\alpha$--;

Line 11, "$\propto$ channel $\propto$." should read --$\alpha$ channel $\alpha$.--;

Line 13, "$\propto$ channel $\propto$," should read --$\alpha$ channel $\alpha$,--;

Line 14, "$\propto$ channel $\propto$" should read --$\alpha$ channel $\alpha$--;

Line 17, "$\propto$ channel" should read --$\alpha$ channel--;

Line 25, "$\propto$ channel $\propto$)" should read --$\alpha$ channel $\alpha$)--; and Line 29, "$\propto$ channel $\propto$." should read --$\alpha$ channel $\alpha$.--.

Signed and Sealed this

Sixteenth Day of September, 2008

JON W. DUDAS
*Director of the United States Patent and Trademark Office*